(12) United States Patent
Chen

(10) Patent No.: US 7,093,609 B2
(45) Date of Patent: Aug. 22, 2006

(54) AIR INFLATION TUBE OF A MINI-SIZE AIR PUMP

(76) Inventor: Chih-Ming Chen, PO Box 82-144, Taipei (TW)

(*) Notice: Subject to any disclaimer, the term of this patent is extended or adjusted under 35 U.S.C. 154(b) by 113 days.

(21) Appl. No.: 10/856,870

(22) Filed: Jun. 1, 2004

(65) Prior Publication Data

US 2005/0263185 A1    Dec. 1, 2005

(51) Int. Cl.
*F01K 15/20* (2006.01)

(52) U.S. Cl. ............... 137/231; 137/223; 251/230
(58) Field of Classification Search ............ 137/223, 137/228, 231; 251/230
See application file for complete search history.

(56) References Cited

U.S. PATENT DOCUMENTS

| 1,933,610 | A | * | 11/1933 | Wahl | 137/228 |
| 2,716,998 | A | * | 9/1955 | Knasko | 137/231 |
| 3,220,695 | A | * | 11/1965 | Jones et al. | 251/263 |
| 3,923,325 | A | * | 12/1975 | Slater, Jr. | 285/312 |
| 5,902,097 | A | * | 5/1999 | Wu | 417/440 |
| 5,921,269 | A | * | 7/1999 | Wu | 137/223 |
| 6,146,116 | A | * | 11/2000 | Wu et al. | 417/569 |
| 6,289,920 | B1 | * | 9/2001 | Wang | 137/223 |
| 2003/0221724 | A1 | * | 12/2003 | Lo-Pin | 137/223 |

* cited by examiner

*Primary Examiner*—Eric Keasel
*Assistant Examiner*—Craig Price
(74) *Attorney, Agent, or Firm*—Leong C. Lei

(57) ABSTRACT

An air inflation tube of a mini-size air pump is disclosed. The air inflation tube of the air pump has a dual direction air inflation capability, that is, inflation and deflation, and the pressure releasing and air pumping are done by the same tubular body to solve the problem of excessive tire pressure without removing the air inflation tube.

1 Claim, 6 Drawing Sheets

AIR INFLATION TUBE OF A MINI-SIZE AIR PUMP

BACKGROUND OF THE INVENTION (a) Technical Field of the Invention

The present invention relates to an air inflation tube of a mini-size air pump assembly, and in particular, to an air inflation tube which possesses an air inflation and air pressure releasing dual direction mechanism.

(b) Description of the Prior Art

FIGS. 1 and 2 depict two types of air inflation tube of air inflation head. The first one, as shown in FIG. 1, is a locking type air inflation head A1, and the second type, as shown in FIG. 2, is a twisting type air inflation head (A1-1). These two types can provide connection and air inflation mechanism, and the pumping and operation are as follows:

Air inflation: the nozzle of the tire is removed and a nozzle screw mount A2 is connected to the air inflation head A1. As for the air inflation head A1-1 of FIG. 2, the air inflation mount A2-1 is mounted to the external screw mount of the nozzle and the pivotal shaft A3-1 is twisted. The compressed air from these air pump will pass through air tube A4 to the tire.

SUMMARY OF THE INVENTION

Accordingly, it is an object of the present invention is to provide air inflation tube of a mini-size air pump, having an air inflation mount, a pivotal shaft, a rubber pad, an air-outlet head, a leak-proof rubber pad, a pressure mount, an extension spring, a plug head, an adjustment rod, a ratchet button, a locking cap and a rubber mount, characterized in that the rear position of the air inflation mount is installed an air-venting device and the face of the pivotal shaft is a through slot allowing the exposure of the rubber mount, the rear section of the air outlet head of the air-venting device is a screw seat body in communication with an air passage of the air outlet head formed integrally, the external edge of the rear section of the air-outlet head is threaded for locking with the locking cap, and the bottom edge of the screw seat body is inserted with a leakage-proof rubber pad which is positioned by the press mount at the upper section thereof and the edge section of the bottom step layer of the screw seat body; the hollow section of the press mount is for the mounting of an extension spring which is the source of the force to force up the plug head, the upper section of the plug head is correspondingly mounted with an adjusting rod and the ratchet button, wherein the ratchet button is in combination with the adjusting ratchet at the bottom section of the shaft, and further, the teeth at the external edge of the shaft is a matching pair with the teeth path within the locking cap, and the adjusting rod is in combination with the inner teeth path by the adjusting teeth, whereby the adjusting rod, the ratchet button and the teeth path within the locking cap to provide up down reciprocating movement, and as a result of the pushing of teeth, the shaft of the adjusting rod is driven to form a rotational movement to provide a recess and a protrusion.

Yet still another object of the present invention is to provide an air inflation tube of a mini-size air pump, wherein the air venting device is formed integrally by the rear position of the air-venting head, and is formed into a screw seat body, the lower section of a bead shaft has an extension spring, and the bead shaft has a bead and the shaft body is protruded out of the locking cap, and a leakage-proof rubber pad is provided onto the bead between the locking cap and the screw seat body, and the body of the bead valve is provided with a leakage proof rubber band which can be operated by controlling the speed of air-venting.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
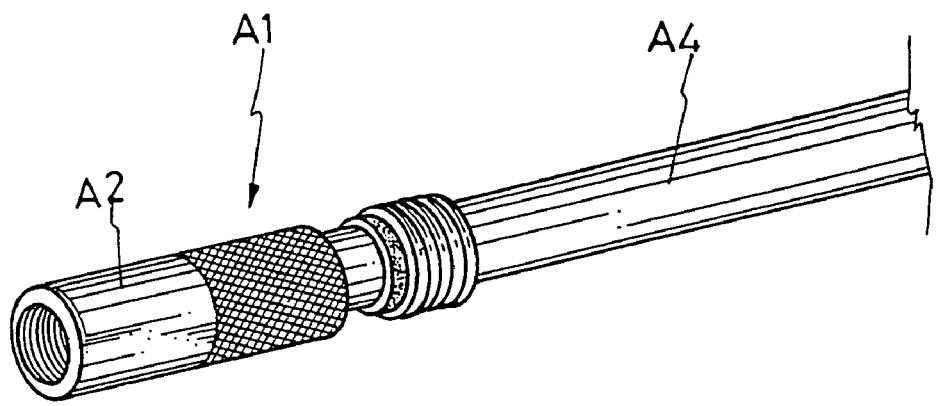
FIG. 1 is a perspective view of a conventional locking air inflation head.
Figure 2:
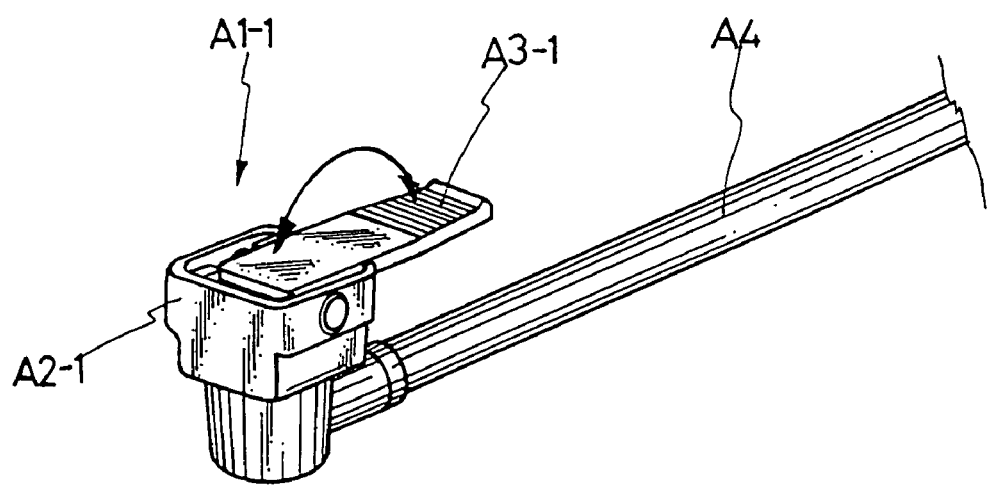
FIG. 2 is a perspective view of a conventional twisting air inflation head.
Figure 3:
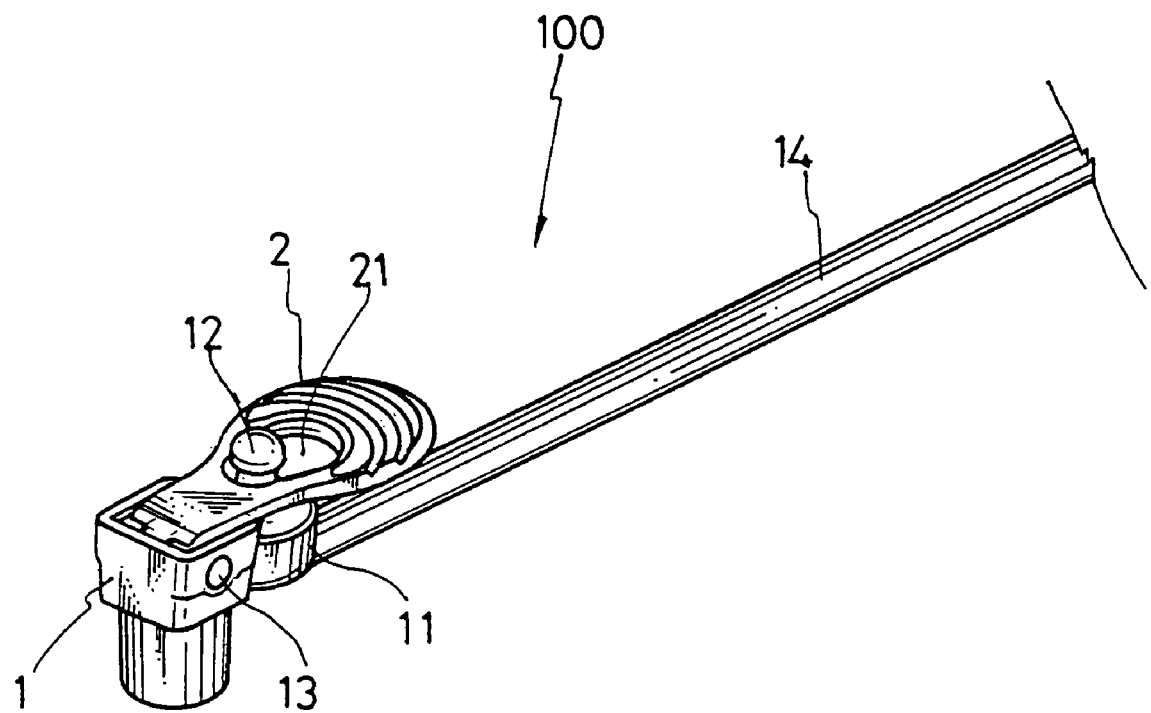
FIG. 3 is a perspective view of an air inflation tube assembly of the present invention.

Referring to FIG. 3, there is shown the air inflation of the air tube assembly 100 of the present invention. The pivotal shaft of the air inflation mount is mounted to the external screw mount of the air nozzle of the tire.

Figure 4:
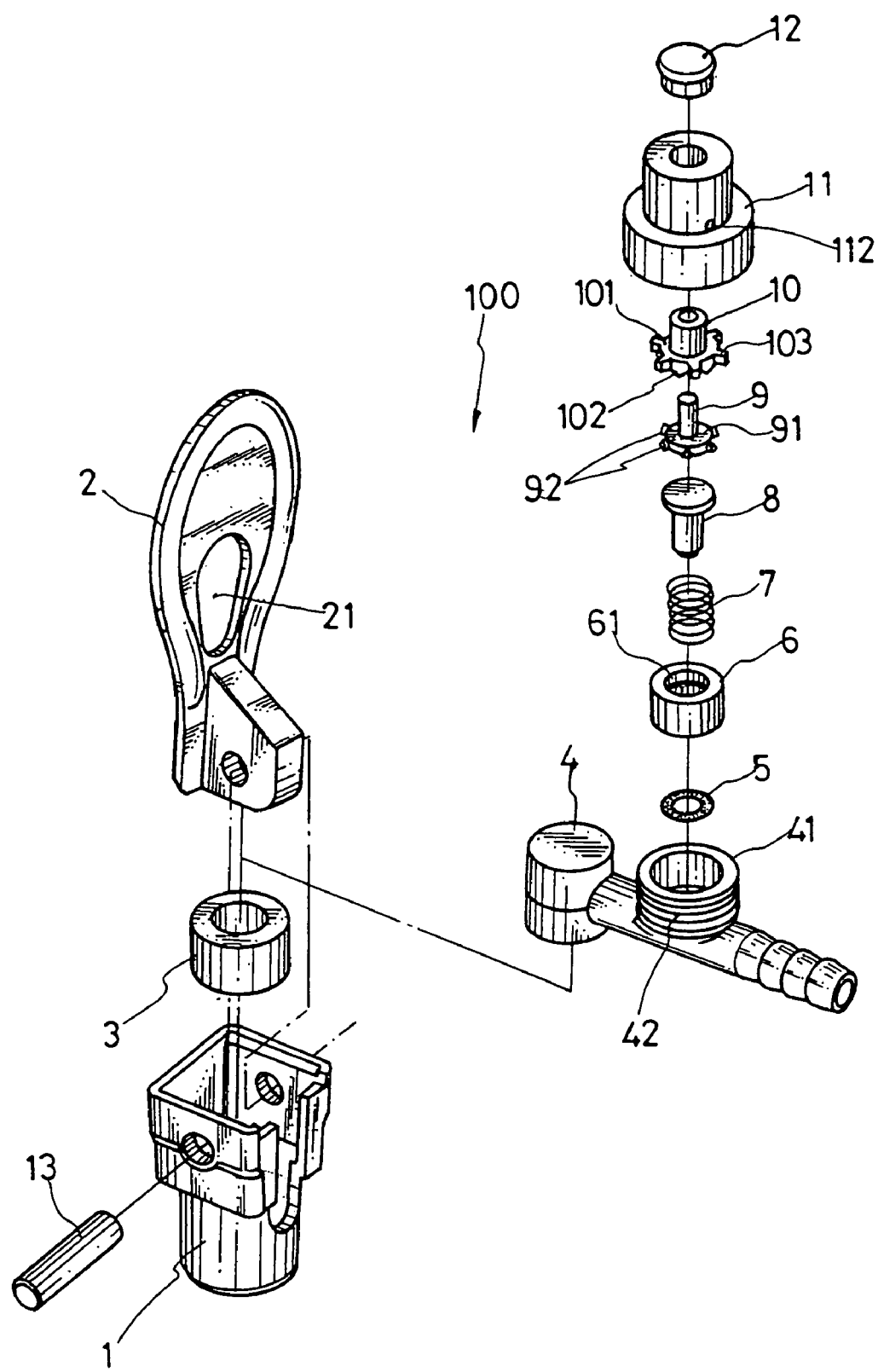
FIG. 4 is an exploded view of the parts of the air inflation tube assembly of the present invention.

As shown in FIG. 4, the air tube assembly 100, includes an air inflation mount 1, a pivotal shaft 2, a rubber pad 3, art air-outlet head 4, a leak-proof rubber packing 5, a pressure mount 6, a spring 7, a plug head 8, an adjustment rod 9, a ratchet button 10, a locking cap 11, and a rubber mount 12. A peg shaft 13 causes the pivotal shaft 2 to pivotally connect to the air inflation mount 1 to provide twisting capability. The rubber pad 3 together with the nozzle of the tire to provide leak-proof capability. One face of the pivotal shaft 2 has a through slot 21 to expose the button 10 and the rubber mount 12 so as to provide "locking-shut" or "locking-pressure release".

Figure 5:
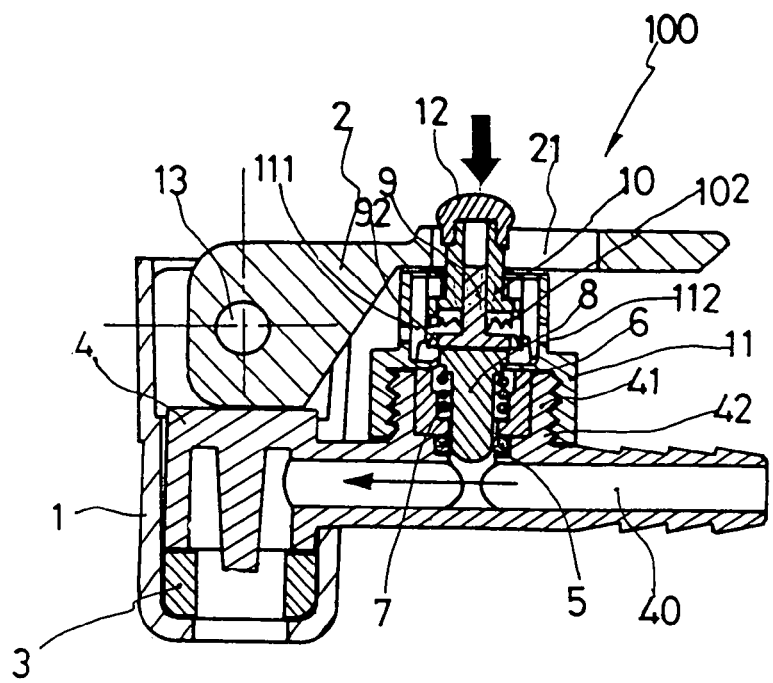
FIG. 5 is a sectional view of the parts of the air inflation tube assembly of the present invention.
Figure 6:
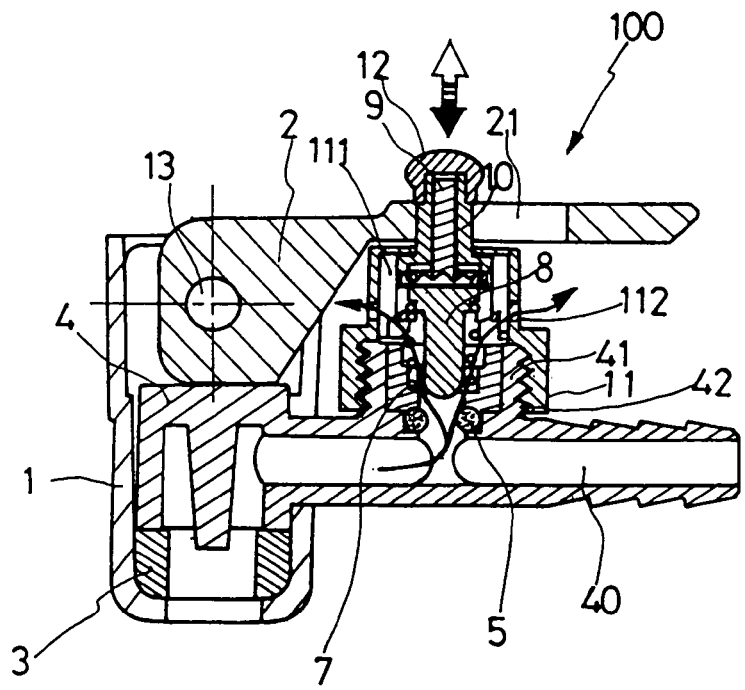
FIG. 6 is a sectional view showing the air-pressure release of the air inflation tube of the present invention.

Referring to FIGS. 5 and 6, the front direction of the air outlet head 4 of the pressure releasing device is in combination with the air inflation mount 1, and the rear direction is connected to the air tube 14 so as to provide an air-supply tube head. A screw seat body 41 is located between the air outlet head 4 and the air inflation mount head 1, and the interior of the screw seat body 41 is hollow which is in communication with the air passage 40 of the air-outlet head 4. The screw seat bad 41 has an externally threaded radial neck 42 for locking with the locking cap 11. As shown in FIGS. 4, 5 and 6, the inner bottom edge of the screw seat body 41 is inserted with a leak-proof rubber packing 5 being positioned by the pressure mount 6 with the bottom step layer of the screw seat body 41. The pressure mount 6 provides a positioning function, and has a stepped center hole 61 for receiving the spring 7 which is designed to force the plug head 8 to go upwardly.

On the top of the plug head 8 are mounted the adjustment shaft 9 and the ratchet button 10. The ratchet button 10 has a tubular shaft 101 provided with a ratchet 102 to match with the adjusting teeth 92 provided on the shaft 91 of the adjustment rod 9. The ratchet button 10 causes the teeth 103 provided on a lower end of the tubular shaft 101 and the teeth passage 111 to correspond with each other. The teeth passage 111 has dual layered structure and the adjustment rod 9 has a plurality of adjusting teeth 92 to correspond with the teeth passage 111. Thus, the adjustment rod 9, the ratchet button 10 and the teeth passage 111 of the locking cap 11 cause an up and down reciprocation movement and drive the shaft 91 to form a rotational movement. By using the rotational movement and the adjusting teeth 92 corresponding to the dual layered structure, a depression and a protrusion mechanism are obtained. In combination with the spring 7, the plug head 8 and the adjustment rod 9 are simultaneously proceeded to recess and protrusion operation. This causes the air outlet head 4 to provide an open and close function.

Figure 7:
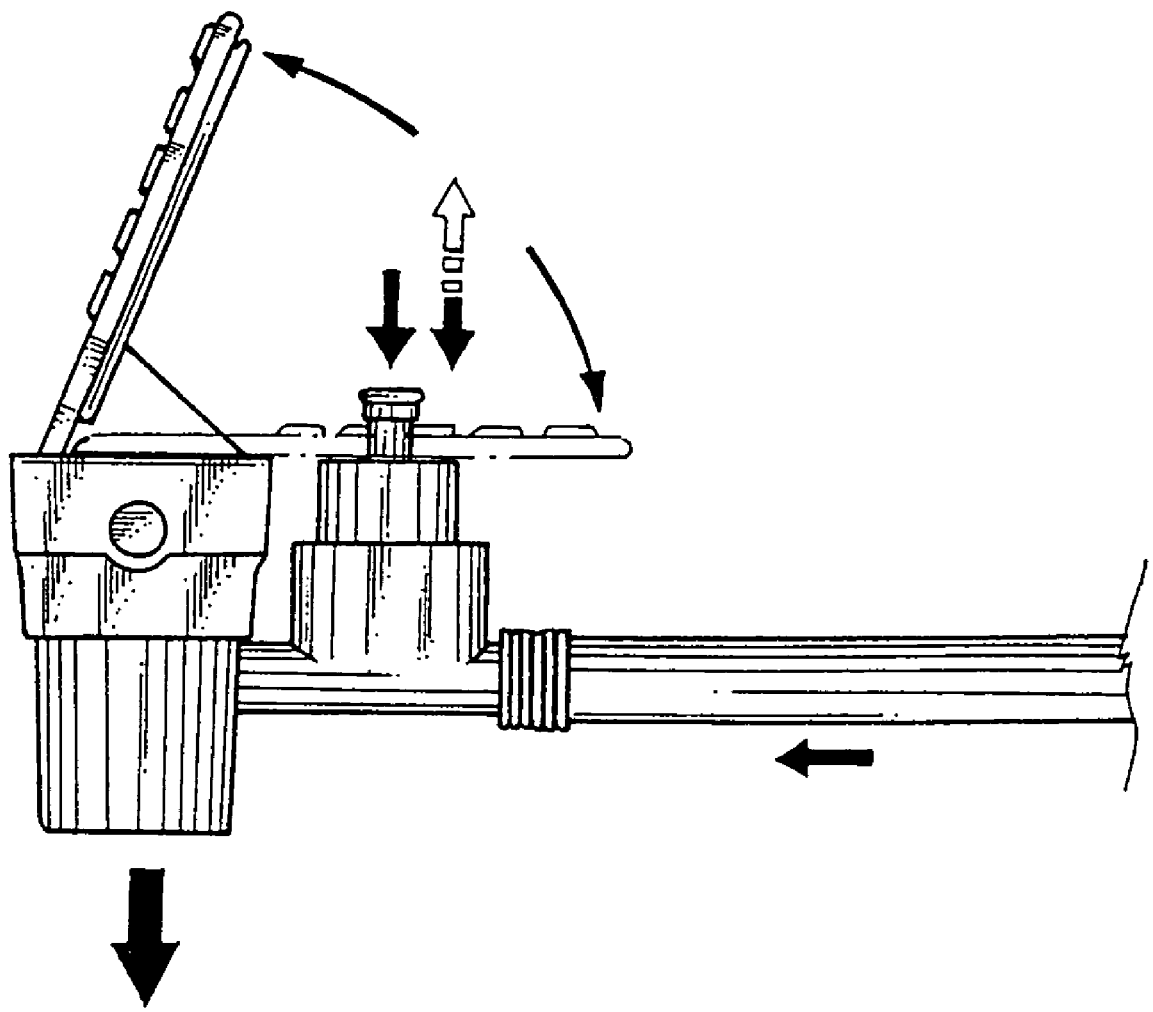
FIG. 7 is a schematic view showing the operation of the first preferred embodiment.

In accordance with the present invention, during air inflation, the air releasing device is at a close state. If the pressure is too much and a release of the pressure is needed, the rubber pad 12 is depressed, and the pressure of the tire will be discharged via the discharge hole 112. As shown in FIG. 6, the shuting of air releasing is always self-locking. That is to say, the pressure releasing status or the shuting state is always maintained. The rubber mount 12 is depressed once if the air pressure releasing is to be stopped. In other words, the depression of the rubber mount 12 causes a releasing of pressure or shuting of air pressure releasing, as shown in FIG. 7.

Figure 8:
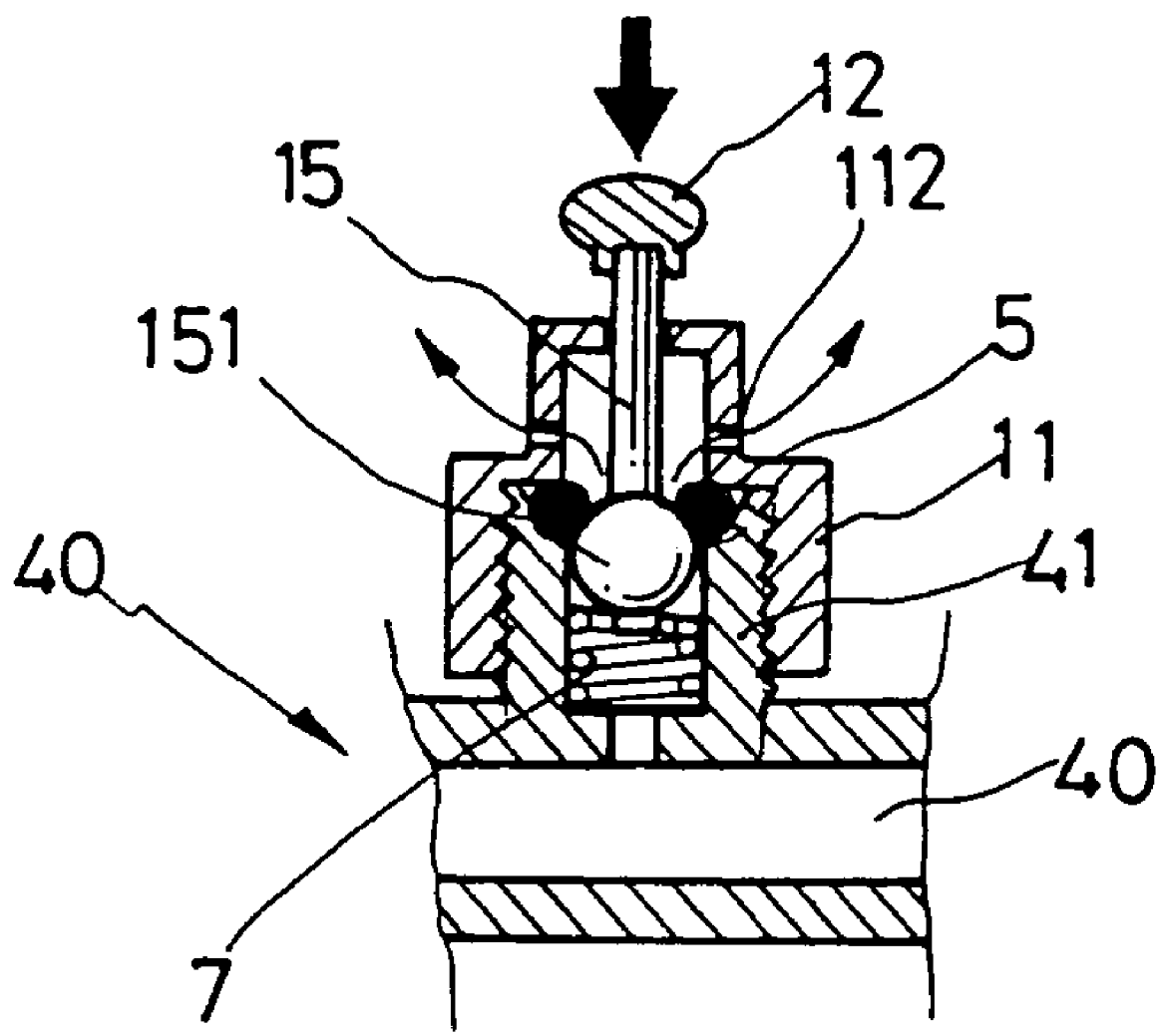
FIG. 8 is a schematic view showing the operation of the second preferred embodiment.

As shown in FIG 8, the pressure releasing device is formed at the rear position of the air outlet head 4 with a screw seat body 41. The releasing pressure structure is by way of depression. A bead valve rod 15 is in combination with a spring 7. The bead valve rod 15 includes a bead valve 151 and the rod body is extended to the outside of the locking cap 11. Next, a leak proof rubber packing 5 smaller than the bead valve 151 is located between the locking cap 11 and the screw seat body 41. When the bead valve rod 15 is depressed, the air pressure will move from the bead valve 151 via the air discharging hole 112 of the lacking cap 11. This structure facilitates rapid pressure releasing and the releasing of pressure can be easily controlled. The pressure gauze indication of the air pump can provide precise pressure reading for the tire.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:
1. An air inflation tube of a mini-size air pump comprising:
   an air inflation mount;
   a screw seat body having an end provided with an air outlet head, said screw seat body having an intermediate portion provided with an externally threaded radial neck, said screw seat body having a longitudinal air passage and a radial passage, said radial passage extending through said externally threaded radial neck, said air outlet bead being fitted in said air inflation mount;
   a pressure mount fitted in said externally threaded radial neck and having a stepped center hole;
   a spring fitted in said stepped center hole;
   a plug head fitted in said stepped center hole and supported by said spring;
   an adjustment rod having a shaft which has an enlarged end provided with a plurality of adjusting teeth, said adjustment rod being disposed on said plug head;
   a ratchet button having a tubular shaft fined over said shaft of said adjustment rod, said tubular shaft having a lower end provided with a plurality of teeth engaged with said adjusting teeth of said adjustment rod;
   a locking cap threaded engaged with said externally threaded radial neck of said screw seat body and having a center through hole for passage of said tubular shaft of said locking cap, said locking cap having a radial discharge hole;
   a rubber pad fitted in said air inflation mount and positioned under said air outlet head of said screw seat body;
   a pivotal shaft having an end pivotally fined in said air inflation mount by a peg shaft; and
   a leak-proof packing fitted under said pressure mount.

* * * * *